(12) United States Patent
Tani

(10) Patent No.: US 7,394,463 B2
(45) Date of Patent: Jul. 1, 2008

(54) METHOD FOR GENERATING THREE-DIMENSIONAL MESH METHOD FOR MAGNETIC FIELD OF ROTATING MACHINE, SYSTEM FOR GENERATING THREE-DIMENSIONAL MESH, SYSTEM FOR ANALYZING MAGNETIC FIELD OF ROTATING MACHINE, COMPUTER PROGRAM, AND RECORDING MEDIUM

(75) Inventor: Koji Tani, Osaka (JP)

(73) Assignee: The Japan Research Institute, Limited, Tokyo (JP)

( * ) Notice: Subject to any disclaimer, the term of this patent is extended or adjusted under 35 U.S.C. 154(b) by 225 days.

(21) Appl. No.: 10/536,328

(22) PCT Filed: Nov. 29, 2002

(86) PCT No.: PCT/JP02/12572

§ 371 (c)(1),
(2), (4) Date: May 26, 2005

(87) PCT Pub. No.: WO2004/051517

PCT Pub. Date: Jun. 17, 2004

(65) Prior Publication Data

US 2006/0033734 A1    Feb. 16, 2006

(51) Int. Cl.
*G06T 17/00* (2006.01)

(52) U.S. Cl. .................................................. 345/420
(58) Field of Classification Search ........................ None
See application file for complete search history.

(56) References Cited

U.S. PATENT DOCUMENTS 5,214,752 A * 5/1993 Meshkat et al. ............. 345/423
5,570,460 A * 10/1996 Ramanujam ................ 345/424
5,590,248 A * 12/1996 Zarge et al. ................. 345/421

(Continued)

FOREIGN PATENT DOCUMENTS

EP    1081657 A2    3/2001

(Continued)

OTHER PUBLICATIONS

Kometani et al. 3-D Analysis of Induction Motor with Skewed Slots Using Regular Coupling Mesh. IEEE Transactions on Magnetics. Jul. 2000. vol. 36. Issue 4. pp. 1769-1773.*

(Continued)

*Primary Examiner*—Ulka Chauhan
*Assistant Examiner*—Peter-Anthony Pappas
(74) *Attorney, Agent, or Firm*—Birch, Stewart, Kolasch & Birch, LLP

(57) ABSTRACT

Based on rectangular element data constituting a boundary surface that separates a rotating machine into a stator-side portion and a rotor-side portion, and polygonal or polyhedral element data constituting the stator-side portion and the rotor-side portion excluding the boundary surface, tetrahedral elements including nodes of each of the stator-side portion and the rotor-side portion are created, a node is created at an arbitrary distance from the gravity of the rectangular element in a normal direction for each of the rectangular elements on the boundary surface, mesh division is performed for the tetrahedral elements based on the node at the arbitrary distance and nodes on the boundary surface, and mesh division is further performed based on nodes of the stator and the rotor.

4 Claims, 7 Drawing Sheets

U.S. PATENT DOCUMENTS

| | | | | |
|---|---|---|---|---|
| 5,671,343 | A | * | 9/1997 | Kondo et al. ................. 345/419 |
| 5,729,670 | A | * | 3/1998 | Strumolo et al. ............ 345/423 |
| 5,768,156 | A | * | 6/1998 | Tautges et al. ................. 716/20 |
| 5,844,564 | A | * | 12/1998 | Bennis et al. ................ 345/423 |
| 6,301,192 | B1 | * | 10/2001 | Reise ........................... 367/11 |
| 6,434,491 | B1 | * | 8/2002 | Miyata et al. ................. 702/38 |

FOREIGN PATENT DOCUMENTS

| | | |
|---|---|---|
| JP | 7-319945 A | 12/1995 |
| JP | 2001-155055 A | 6/2001 |

OTHER PUBLICATIONS

Ho, S. L. et al., Generation and Rotation of 3-D Finite Element Mesh for Skewed Rotor Induction Motors Using Extrusion Technique, IEEE Transact-ions on Magnetics, vol. 35, No. 3, pp. 1266-1269, Jun. 1, 1999.

Ho, S. L. et al., Generation and Rotation of 3-D Finite Element Mesh for Skewed Rotor Induction Motors Using Extrusion Technique, IEEE Transact-ions on Magnetics, vol. 35, No. 3, pp. 1266-1269, Jun. 1, 1999.

Taniguchi, Yasuto et al., "Skew o Koryo Shita Eikyu Jishaku Motor no Sanjigen Jikai Kaiseki", The Institute of Electrical Engineers of Japan Kaitenki Kenkyukai Shiryo, RM-00-110 to 119 • 121 to 138, pp. 157-161, Oct. 19, 2000, p. 158, left column, 2.1 Procedure of Calculation Using Mesh Coupling Method, Fig. 1.

* cited by examiner (a)

(b)

(c)

(d)

(a)

(b)

(c)

(d)

(a)

(b)

(c)

(d)

METHOD FOR GENERATING THREE-DIMENSIONAL MESH METHOD FOR MAGNETIC FIELD OF ROTATING MACHINE, SYSTEM FOR GENERATING THREE-DIMENSIONAL MESH, SYSTEM FOR ANALYZING MAGNETIC FIELD OF ROTATING MACHINE, COMPUTER PROGRAM, AND RECORDING MEDIUM

This application is the national phase under 35 U.S.C. § 371 of PCT International Application No. PCT/JP02/12572 which has an International filing date of Nov. 29, 2002 and designated the United States of America.

TECHNICAL FIELD

The present invention relates to a method of generating a three-dimensional mesh of a rotating machine including a spatial area, for the analysis of electromagnetic field using a finite element method; a three-dimensional mesh generator for use in implementing the method; a computer program for realizing a computer as the three-dimensional mesh generator; a computer-readable memory product storing the computer program; a method for analyzing magnetic field of a rotating machine by using a three-dimensional mesh; a magnetic field analyzer for use in implementing the method; a computer program for realizing a computer as the magnetic field analyzer; and a computer-readable memory product storing the computer program.

BACKGROUND ART

For the analysis of the structure of a three-dimensional object, a finite element method is mainly used. In the finite element method, a three-dimensional object is expressed by a combination of a plurality of polyhedral elements, and numerical analysis is performed by defining that the respective elements are joined at a finite number of nodes constituting the elements. The operation of dividing a three-dimensional object into a plurality of elements is called mesh division, and a divided mesh of a three-dimensional model to be analyzed is defined by mesh data composed of information about the positions of nodes, etc.

In an electromagnetic field analysis using the finite element method that takes a rotational motion into consideration, a three-dimensional mesh of a rotating machine such as a motor is generated by the following method. In a spatial area between a stator and a rotor, a boundary surface for separating the rotating machine and the spatial area into a stator-side portion and a rotor-side portion is set, and two-dimensional meshes of the stator-side portion and the rotor-side portion are generated on a cross section perpendicular to a rotation axis direction. The generated two-dimensional mesh is extended in the rotation axis direction to generate a three-dimensional mesh of an analysis area composed of the rotating machine and the spatial area. By shifting the three-dimensional mesh of the rotor-side portion from the boundary surface by an amount of one element with respect to the stator-side portion, it is possible to rotate the rotor, and thus it is possible to perform a magnetic field analysis of the rotating machine while rotating the rotor.

Moreover, by generating a three-dimensional mesh of the entire rotating machine including the spatial area every time the rotor is rotated, it is also possible to perform a magnetic field analysis of the rotating machine while rotating the rotor.

With the above-described method of generating a three-dimensional mesh by extending a two-dimensional mesh, it is possible to express the shape of a rotating machine having a simple shape by the generated three-dimensional mesh. However, for a crow-pole type rotating machine or a rotating machine with a coil end having a complicated shape, it is impossible to generate a three-dimensional mesh showing the structure of the rotating machine by extending a two-dimensional mesh since the shape of the rotating machine is not uniform on the cross sections perpendicular to the rotation axis.

On the other hand, with the above-described method of generating a three-dimensional mesh of the entire rotating machine every time the rotor is rotated, it is possible to generate a three-dimensional mesh of a rotating machine having a complicated shape, but it is necessary to regenerate a three-dimensional mesh every time the rotor is rotated, and therefore this method has the problem that it requires enormous calculation time for the analysis.

DISCLOSURE OF THE INVENTION

The present invention has been made with the aim of solving the above problems, and it is an object of the present invention to provide a three-dimensional mesh generation method capable of generating a three-dimensional mesh suitable for a magnetic field analysis of a rotating machine having a complicated shape by generating three-dimensional meshes of a stator-side portion and a rotor-side portion by using data of quadrilateral elements into which a boundary surface separating the rotating machine into the stator-side portion and the rotor-side portion is divided; a three-dimensional mesh generator for use in implementing the method; a computer program for realizing a computer as the three-dimensional mesh generator; a computer-readable memory product storing the computer program; a method of analyzing magnetic field of the rotating machine in a short calculation time by rotating the three-dimensional mesh of the rotor-side portion from the boundary surface; a magnetic field analyzer for use in implementing the method; a computer program for realizing a computer as the magnetic field analyzer; and a computer-readable memory product storing the computer program.

A three-dimensional mesh generation method according to a first aspect of the invention is a method of generating three-dimensional meshes of a stator-side portion and a rotor-side portion of a rotating machine composed of a stator and a rotor by setting a boundary surface in a spatial area between the stator and the rotor to separate the rotating machine and the spatial area into the stator-side portion and the rotor-side portion, prescribing shapes of the stator-side portion and the rotor-side portion, and dividing each of the stator-side portion and the rotor-side portion into polyhedral elements or polygonal elements, and characterized by comprising: dividing the boundary surface into quadrilateral elements; creating tetrahedral elements including nodes of each of the stator-side portion and the rotor-side portion; creating a point at an arbitrary distance from a gravity of the quadrilateral element in a normal direction for each of the quadrilateral elements constituting the boundary surface; performing mesh division for the tetrahedral elements based on the point at the arbitrary distance and nodes on the boundary surface; and further performing mesh division based on nodes of the stator and the rotor to generate three-dimensional meshes.

A three-dimensional mesh generation method according to a second aspect of the invention is a method of generating a three-dimensional mesh of a rotating machine including a spatial area between a stator and a rotor, and characterized by comprising: setting a boundary surface in the spatial area to separate the rotating machine and the spatial area into a stator-side portion and a rotor-side portion; prescribing shapes of the stator-side portion and the rotor-side portion; dividing the boundary surface into quadrilateral elements; dividing the stator-side portion and the rotor-side portion excluding the boundary surface into polyhedral elements or polygonal elements; creating tetrahedral elements including nodes of each of the stator-side portion and the rotor-side portion; creating a point at an arbitrary distance from a gravity of the quadrilateral element in a normal direction for each of the quadrilateral elements constituting the boundary surface; performing mesh division for the tetrahedral elements based on the point at the arbitrary distance and nodes on the boundary surface; and further performing mesh division based on nodes of the stator and the rotor to generate three-dimensional meshes.

A three-dimensional mesh generation method according to a third aspect of the invention is based on the first or second aspect of the invention, and characterized in that the mesh division is performed using the Delaunay method.

A magnetic field analysis method for a rotating machine according to a fourth aspect of the invention is a method of performing a magnetic field analysis of a rotating machine by a finite element method using a three-dimensional mesh of the rotating machine including a spatial area between a stator and a rotor, and characterized by comprising: generating a three-dimensional mesh of a rotating machine to be analyzed by using the three-dimensional mesh generation method of any one of the first through third aspects of the invention; and rotating the three-dimensional mesh of the rotor-side portion by shifting the elements from the boundary surface, and performing a magnetic field analysis by the finite element method.

A three-dimensional mesh generator according to a fifth aspect of the invention is a three-dimensional mesh generator for generating three-dimensional meshes of a stator-side portion and a rotor-side portion of a rotating machine composed of a stator and a rotor based on element data generated by setting a boundary surface in a spatial area between the stator and the rotor to separate the rotating machine and the spatial area into the stator-side portion and the rotor-side portion, prescribing shapes of the stator-side portion and the rotor-side portion, dividing the boundary surface into quadrilateral elements, and dividing each of the stator-side portion and the rotor-side portion excluding the boundary surface into polyhedral elements or polygonal elements, and characterized by comprising: means for creating tetrahedral elements including nodes of each of the stator-side portion and the rotor-side portion; means for creating a point at an arbitrary distance from a gravity of the quadrilateral element in a normal direction for each of the quadrilateral elements constituting the boundary surface; first dividing means for performing mesh division for the tetrahedral elements based on the point at the arbitrary distance and nodes on the boundary surface; and second dividing means for further performing mesh division based on nodes of the stator and the rotor.

A three-dimensional mesh generator according to a sixth aspect of the invention is based on the fifth aspect of the invention, and characterized in that the first dividing means and the second dividing means perform mesh division using the Delaunay method.

A magnetic field analyzer for a rotating machine according to a seventh aspect of the invention is an apparatus for performing a magnetic field analysis of a rotating machine by a finite element method using a three-dimensional mesh of the rotating machine including a spatial area between a stator and a rotor, and characterized by comprising: means for generating a three-dimensional mesh of a rotating machine to be analyzed by using the three-dimensional mesh generator of the fifth or sixth aspect of the invention; and means for rotating the three-dimensional mesh of the rotor-side portion by shifting the elements from the boundary surface, and performing a magnetic field analysis by the finite element method.

A computer program according to an eighth aspect of the invention is a computer program for causing a computer to generate three-dimensional meshes of a stator-side portion and a rotor-side portion of a rotating machine composed of a stator and a rotor by using element data generated by setting a boundary surface in a spatial area between the stator and the rotor to separate the rotating machine and the spatial area into the stator-side portion and the rotor-side portion, prescribing shapes of the stator-side portion and the rotor-side portion, dividing the boundary surface into quadrilateral elements, and dividing each of the stator-side portion and the rotor-side portion into polyhedral elements or polygonal elements, and characterized by causing a computer to execute the steps of creating tetrahedral elements including nodes of each of the stator-side portion and the rotor-side portion; creating a point at an arbitrary distance from a gravity of the quadrilateral element in a normal direction for each of the quadrilateral elements constituting the boundary surface; performing mesh division for the tetrahedral elements based on the point at the arbitrary distance and nodes on the boundary surface; and further performing mesh division based on nodes of the stator and the rotor to generate three-dimensional meshes.

A computer program according to a ninth aspect of the invention is a computer program for causing a computer to perform a magnetic field analysis of a rotating machine by a finite element method using a three-dimensional mesh of the rotating machine including a spatial area between a stator and a rotor, and characterized by causing a computer to execute the steps of: generating a three-dimensional mesh of a rotating machine to be analyzed by using the computer program of the eighth aspect of the invention; and rotating the three-dimensional mesh of the rotor-side portion by shifting the elements from the boundary surface, and performing a magnetic field analysis by the finite element method.

A computer-readable memory product according to a tenth aspect of the invention is a memory product readable by a computer and storing a computer program for causing a computer to generate three-dimensional meshes of a stator-side portion and a rotor-side portion of a rotating machine composed of a stator and a rotor by using element data generated by setting a boundary surface in a spatial area between the stator and the rotor to separate the rotating machine and the spatial area into the stator-side portion and the rotor-side portion, prescribing shapes of the stator-side portion and the rotor-side portion, dividing the boundary surface into quadrilateral elements, and dividing each of the stator-side portion and the rotor-side portion into polyhedral elements or polygonal elements, and characterized by storing a computer program for causing a computer to execute the steps of creating tetrahedral elements including nodes of each of the stator-side portion and the rotor-side portion; creating a point at an arbitrary distance from a gravity of the quadrilateral element in a normal direction for each of the quadrilateral elements constituting the boundary surface; performing mesh division for the tetrahedral elements based on the point at the arbitrary distance and nodes on the boundary surface; and further performing mesh division based on nodes of the stator and the rotor to generate three-dimensional meshes.

A computer-readable memory product according to an eleventh aspect of the invention is a memory product readable by a computer and storing a computer program for causing a computer to perform a magnetic field analysis of a rotating machine by a finite element method using a three-dimensional mesh of the rotating machine including a spatial area between a stator and a rotor, and characterized by storing a computer program for causing a computer to execute the steps of: generating a three-dimensional mesh of a rotating machine to be analyzed by using the memory product of the tenth aspect of the invention; and rotating the three-dimensional mesh of the rotor-side portion by shifting the elements from the boundary surface, and performing a magnetic field analysis by the finite element method.

In the first, second, fifth, eighth and tenth aspects of the invention, for the magnetic field analysis of a rotating machine, when generating three-dimensional meshes of the stator-side portion and the rotor-side portion by setting a boundary surface in the spatial area between the stator and the rotor of the rotating machine, tetrahedral elements including nodes of each of the stator-side portion and the rotor-side portion are created based on quadrilateral element data constituting the boundary surface divided by a suitable method, and polyhedral element or polygonal element data constituting the stator-side portion and the rotor-side portion excluding the boundary surface; a point is created at an arbitrary distance from the gravity of the quadrilateral element in a normal direction for each of the quadrilateral elements constituting the boundary surface; mesh division is performed for the tetrahedral elements based on nodes on the boundary surface and the arbitrary point; and mesh division is further performed based on nodes constituting the stator and the rotor to generate three-dimensional meshes of the stator-side portion and the rotor-side portion. Accordingly, even for a rotating machine whose shape is so complicated that a three-dimensional mesh cannot be generated by the conventional three-dimensional mesh generation method in which a two-dimensional mesh is generated on a cross section perpendicular to the rotation axis of the rotating machine and a three-dimensional mesh is generated by extending the generated two-dimensional mesh in the rotation axis direction, it is possible to generate three-dimensional meshes of the stator-side portion and the rotor-side portion respectively, and thus it is possible to generate three-dimensional meshes of the stator-side portion and the rotor-side portion for a magnetic field analysis regardless of the shape of the rotating machine.

In the third and sixth aspects of the invention, by performing mesh division for the tetrahedral elements including nodes of each of the stator-side portion and the rotor-side portion by the Delaunay method based on nodes, it is possible to fully automatically divide the stator-side portion and the rotor-side portion into tetrahedral elements to generate meshes.

In the fourth, seventh, ninth and eleventh aspects of the invention, since the magnetic field analysis of the rotating machine is performed by the finite element method using the generated three-dimensional meshes, it is possible to perform accurate magnetic field analysis in a shorter calculation time.

BEST MODE FOR IMPLEMENTING THE INVENTION

The following description will explain the present invention with reference to the drawings illustrating an embodiment thereof.

Figure 1:
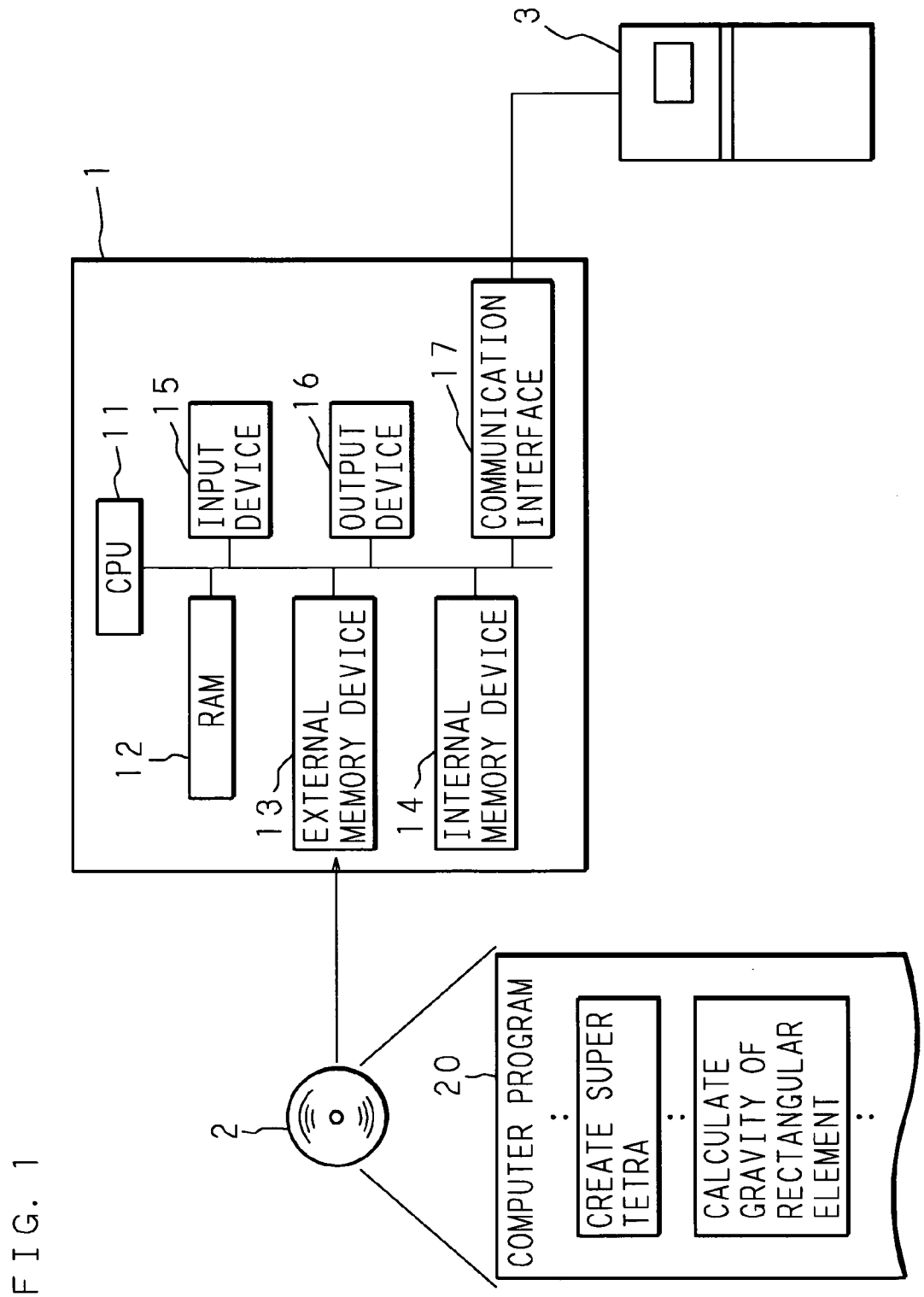
FIG. 1 is a block diagram showing a three-dimensional mesh generator according to the present invention.

FIG. 1 is a block diagram showing a three-dimensional mesh generator according to the present invention. Reference numeral 1 is a three-dimensional mesh generator of the present invention using a computer, which comprises: a CPU 11 for performing processing; a RAM 12; an external memory device 13 such as a CD-ROM drive; and an internal memory device 14 such as a hard disk. By reading a computer program 20 of the present invention from a memory product 2 such as a CD-ROM of the present invention by the external memory device 13, storing the read computer program 20 into the internal memory device 14 and loading the computer program 20 into the RAM 12, the CPU 11 executes processes necessary for the three-dimensional mesh generator 1, based on the computer program 20. The three-dimensional mesh generator 1 comprises an input device 15 such as a keyboard or a mouse, and an output device 16 such as a liquid crystal display or a CRT display, and receives the user's operations such as input of data.

Moreover, the three-dimensional mesh generator 1 may comprise a communication interface 17, and may download the computer program 20 of the present invention from a server device 3 connected to the communication interface 17 and execute processing by the CPU 11.

Next, the following description will explain a three-dimensional mesh generation method of the present invention by using a motor with a rotor surrounded by a stator as a rotating machine. A boundary surface is set at a substantially center of a spatial area between the stator and the rotor to separate the motor including the spatial area into a stator-side portion including the stator and the spatial area positioned inside the boundary surface, and a rotor-side portion including the rotor and the spatial area positioned outside the boundary surface, and three-dimensional meshes of the stator-side portion and the rotor-side portion are respectively generated.

Figure 2:
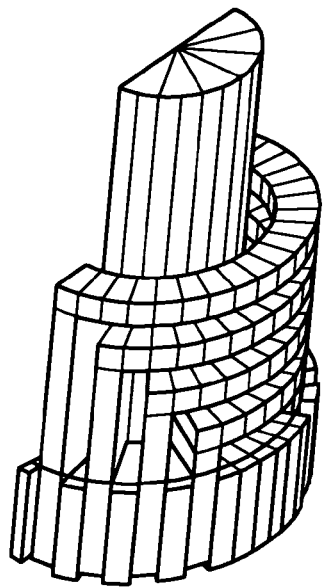
FIG. 2 is a perspective view showing an initial three-dimensional mesh of a rotor-side portion.
Figure 2:
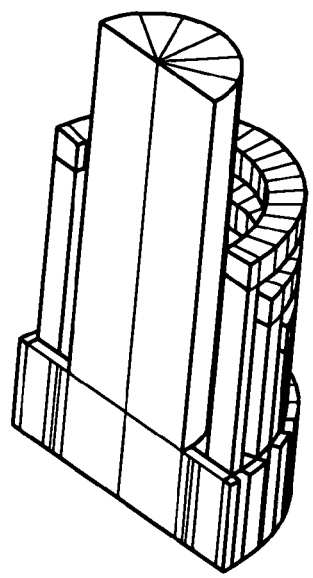
Figure 2:
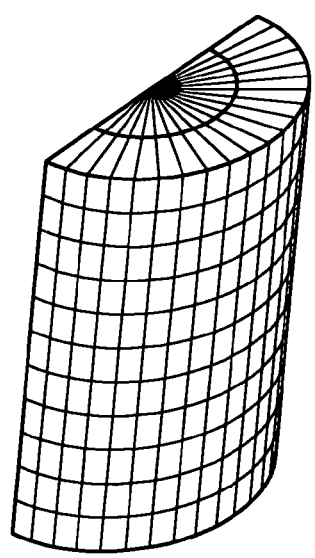
Figure 2:
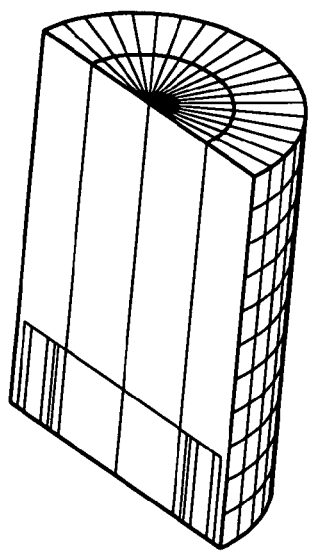

A method of generating a three-dimensional mesh of the rotor-side portion will be explained below. The user generates an initial three-dimensional mesh of the rotor-side portion by using a suitable method such as CAD. First, a shape of the rotor-side portion is prescribed, and the boundary surface is divided into a predetermined number of rectangular elements in a grid form. Next, the rotor-side portion excluding the boundary surface is divided into a predetermined number of polyhedral elements or polygonal elements. FIG. 2 is a perspective view showing the initial three-dimensional mesh of the rotor-side portion. FIG. 2(*a*) is a perspective view showing only the rotor, and FIG. 2(*b*) is a perspective view showing only the rotor rotated by 90 degrees from FIG. 2(*a*). FIG. 2(*c*) is a perspective view showing the rotor-side portion including the spatial area positioned inside the boundary surface, and FIG. 2(*d*) is a perspective view showing the rotor-side portion rotated by 90 degrees from FIG. 2(*c*). When the rotor-side portion excluding the boundary surface is three-dimensionally divided, it is divided into polyhedral elements (hexahedral elements and pentahedral elements). On the other hand, when the rotor-side portion is two-dimensionally divided, it is divided into polygonal elements (quadrilateral elements and triangular elements).

Figure 3:
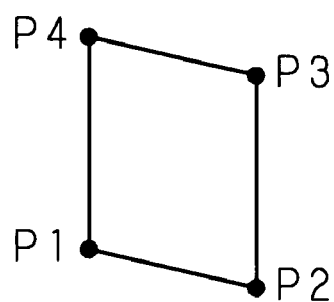
FIG. 3 is an explanatory view showing the steps of generating a final three-dimensional mesh by noting one rectangular element.
Figure 3:
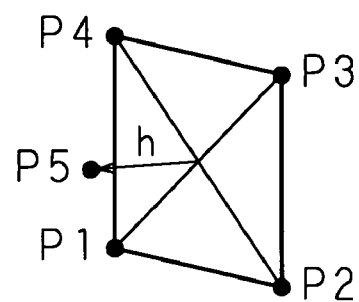
Figure 3:
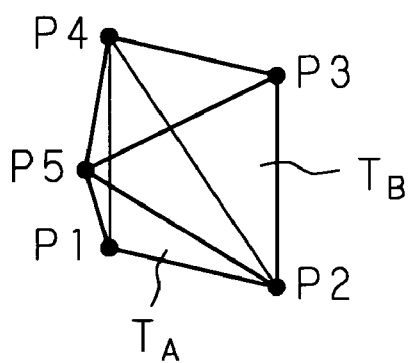
Figure 3:
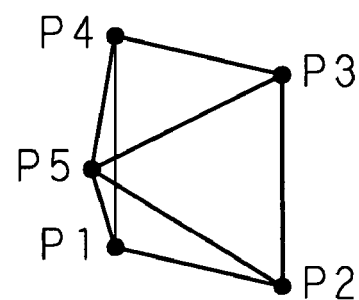

Next, in the three-dimensional mesh generator of the present invention, first, tetrahedral elements (super tetra) including nodes of the initial three-dimensional mesh are created based on the initial three-dimensional mesh data of the rotor-side portion. Thereafter, a new node is created for each of rectangular elements constituting the boundary surface as follows. FIG. 3 is an explanatory view showing the steps of generating a final three-dimensional mesh by noting one arbitrary rectangular element among the rectangular elements constituting the boundary surface. FIG. 3(*a*) is a perspective view of the rectangular element whose vertices are nodes P1, P2, P3 and P4. As shown in FIG. 3(*b*), the gravity of the rectangular element is calculated, and a point is created at an arbitrary distance H from the gravity to the rotor side in a normal direction. If this point is denoted as a node P5, the node P5 is created for all rectangular elements constituting the boundary surface.

Next, mesh division is performed for super tetra by the Delaunay method based on the nodes (P1, P2, P3, and P4) and the node P5 of all rectangular elements. Since the three-dimensional space is divided into tetrahedral elements by the Delaunay method, a three-dimensional mesh composed of tetrahedral elements is created for the super tetra. Consequently, as shown in FIG. 3(*c*), on the boundary surface, a tetrahedral element TA composed of nodes P1, P2, P4 and P5 and a tetrahedral element TB composed of nodes P2, P3, P4 and P5 (or a tetrahedral element TA composed of nodes P1, P2, P3 and P5 and a tetrahedral element TB composed of nodes P1, P3, P4 and P5 (not shown)) are generated. The tetrahedral element TA and tetrahedral element TB are composed of one common triangular element, and six triangular elements that are not shared by TA and TB.

Figure 4:
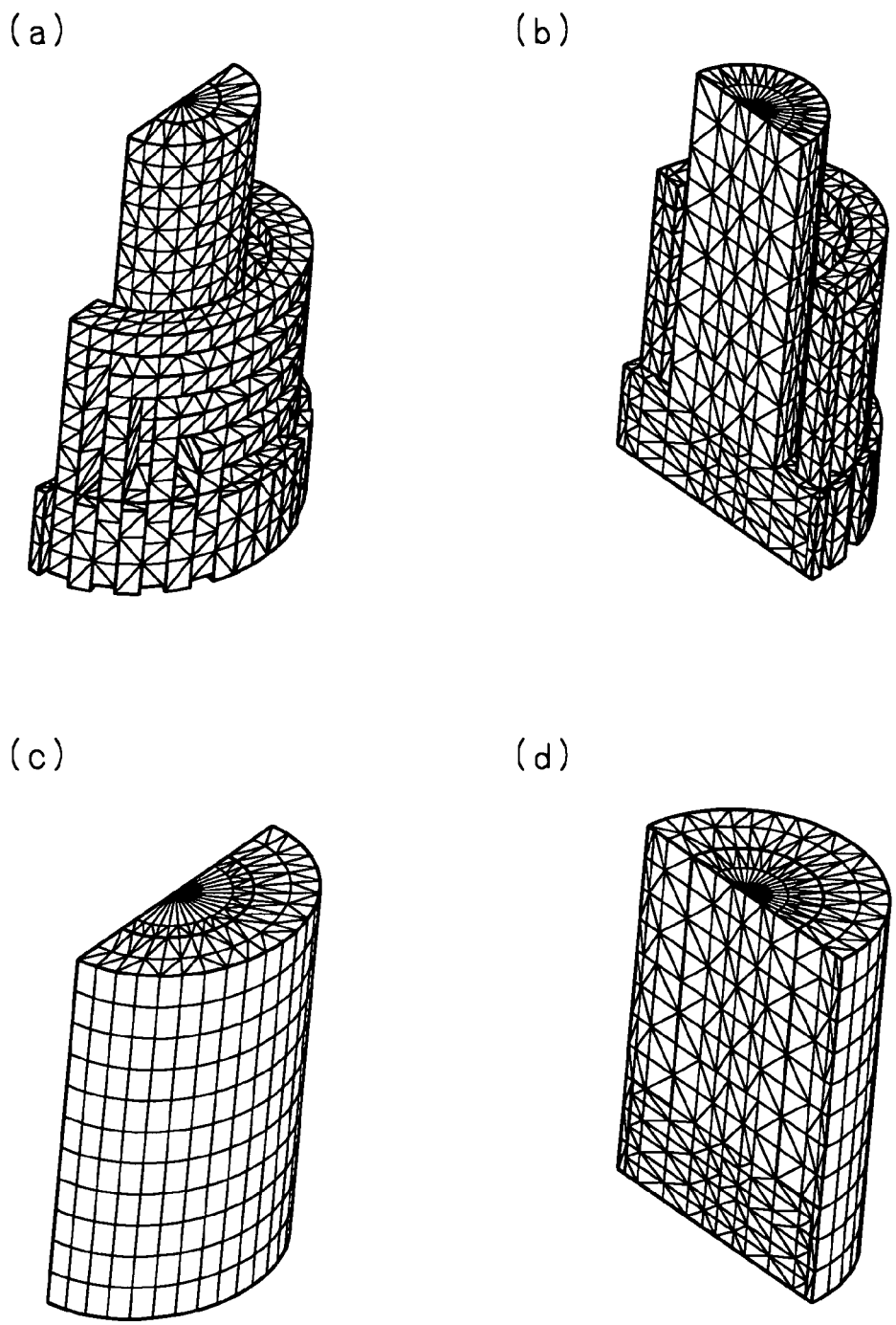
FIG. 4 is a perspective view showing the final three-dimensional mesh of the rotor-side portion.

Further, for the three-dimensional mesh composed of tetrahedral elements generated by performing mesh division by the Delaunay method, mesh division is performed again by the Delaunay method based on the nodes of the rotor. At this time, mesh division is performed so as not to erode the above-mentioned triangular elements constituting the tetrahedral elements TA and the tetrahedral elements TB. A decision is made whether or not the shape of the rotor-side portion is reproduced by the mesh division. If a decision is made that the shape is not reproduced, a new node is suitably added and mesh division is performed again by the Delaunay method. The addition of a node and the mesh division are repeated until a decision is made that the shape is reproduced. Next, among the generated tetrahedral elements, unnecessary tetrahedral elements other than those of the rotor-side portion are deleted. Thereafter, as shown in FIG. 3(*d*), one quadrangular pyramid element is generated by joining the tetrahedral element TA and the tetrahedral element TB. Similarly, by joining all tetrahedral elements constituting the periphery (boundary surface) of the spatial area two by two, quadrangular pyramid elements are generated. FIG. 4 is a perspective view showing the completed final three-dimensional mesh of the rotor-side portion. FIG. 4(*a*) is a perspective view showing only the rotor. FIG. 4(*b*) is a perspective view showing only the rotor rotated by 90 degrees from FIG. 4(*a*). FIG. 4(*c*) is a perspective view showing the rotor-side portion including the spatial area positioned inside the boundary surface, and FIG. 4(*d*) is a perspective view showing the rotor-side portion rotated by 90 degrees from FIG. 4(*c*). On the boundary surface of the final three-dimensional mesh, the same rectangular elements as the rectangular elements of the initial three-dimensional mesh shown in FIG. 2 are reproduced. A three-dimensional mesh in which the whole rotor-side portion except the boundary surface is composed of tetrahedral elements is generated.

Figure 5:
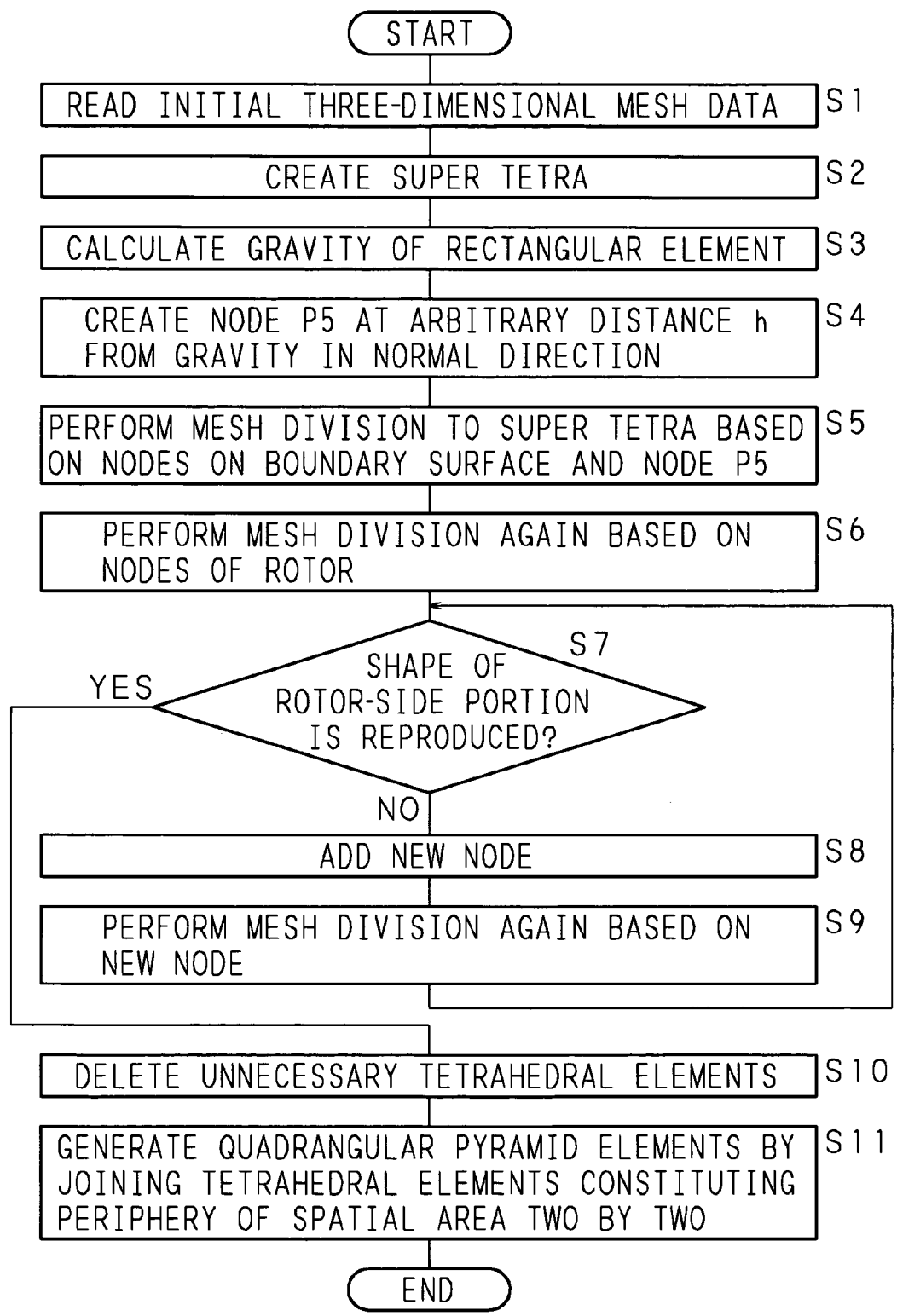
FIG. 5 is a flowchart explaining the processing steps performed by a CPU of the three-dimensional mesh generator of the present invention.
Figure 6:
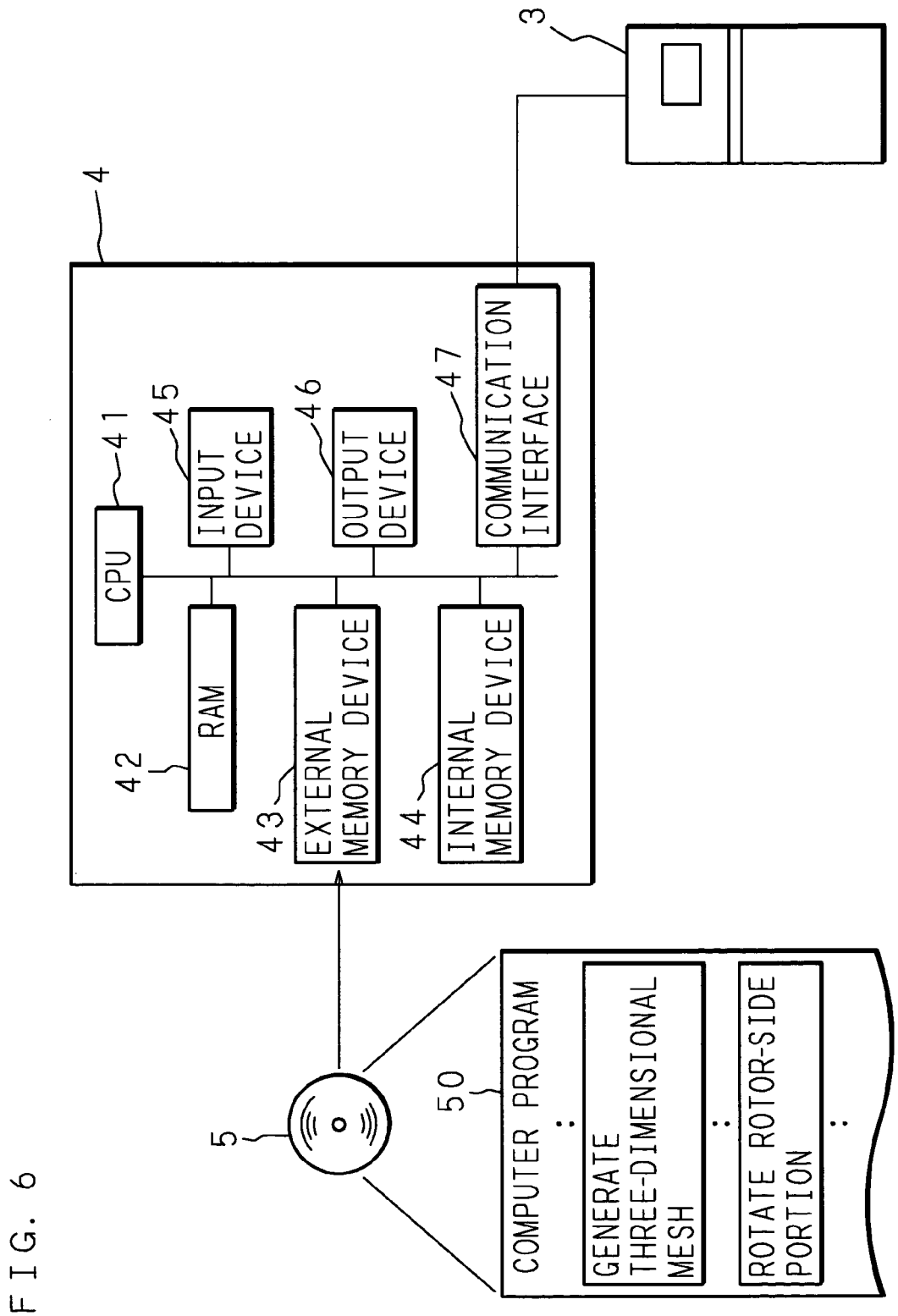
FIG. 6 is a block diagram showing a magnetic field analyzer for a rotating machine according to the present invention.

FIG. 5 is a flowchart explaining the processing steps performed by the CPU 11 of the three-dimensional mesh generator 1 of the present invention. First, the CPU 11 reads the initial three-dimensional mesh data of the rotor-side portion (step S1), and creates tetrahedral elements (super tetra) including the nodes of the rotor-side portion (step S2). For each of the rectangular elements constituting the boundary surface, the CPU 11 calculates the gravity of the rectangular element (step S3), and creates a node P5 at an arbitrary distance h from the gravity calculated in step S3 to the rotor side in a normal direction (step S4). For the super tetra created in step S2, mesh division is performed based on the nodes (P1, P2, P3, and P4) on the boundary surface and the node P5 by the Delaunay method (step S5). For a three-dimensional mesh composed of tetrahedral elements generated in step S5, mesh division is performed again based on the nodes of the rotor by the Delaunay method (step S6). Then, a decision is made whether or not the shape of the rotor-side portion is reproduced (step S7). If a decision is made that the shape is not reproduced (step S7: NO), a new node is added (step S8) and mesh division is performed again based on the new node by the Delaunay method (step S9), and then the procedure is returned to step S7. In step S7, if a decision is made that the shape of the rotor-side portion is reproduced (step S7: YES), unnecessary tetrahedral elements other than those of the rotor-side portion are deleted (step S10), quadrangular pyramid elements are generated by joining tetrahedral elements constituting the periphery (boundary surface) of the spatial area two by two (step S11), and the procedure is finished.

For the stator-side portion, by performing mesh division by the above-described method, rectangular elements constituting the boundary surface and tetrahedral elements constituting the stator-side portion are generated. When generating an initial three-dimensional mesh of the stator-side portion, by setting the number of divisions in dividing the boundary surface into rectangular elements at the same number of divisions on the boundary surface of the rotor-side portion, quadrangular pyramid elements whose base matches the base of the quadrangular pyramid elements constituting the boundary surface of the rotor-side portion are generated on the boundary surface of the stator-side portion.

Although this embodiment illustrates a mode in which the boundary surface is divided into rectangular elements in a grid form, the present invention is not limited to this mode, and it may be possible to implement a mode in which the boundary surface is divided into suitable quadrilateral elements such as parallelograms. Moreover, although a mode in which mesh division is performed for tetrahedral elements by the Delaunay method is illustrated, it may be possible to implement a mode in which mesh division is performed by other dividing method such as an advancing front method.

Next, the following description will explain the steps of a magnetic field analysis method for a rotating machine according to the present invention. Reference numeral 4 is a magnetic field analyzer for a rotating machine of the present invention using a computer, which comprises: a CPU 41 for performing processing; a RAM 42; an external memory device 43 such as a CD-ROM drive; and an internal memory device 44 such as a hard disk. By reading a computer program 50 of the present invention from a memory product 5 such as a CD-ROM of the present invention by the external memory device 43, storing the read computer program 50 into the internal memory device 44 and loading the computer program 50 into the RAM 42, the CPU 41 executes processes necessary for the magnetic field analyzer 4 for a rotating machine, based on the computer program 50. The magnetic field analyzer 4 for a rotating machine comprises an input device 45 such as a keyboard or a mouse, and an output device 46 such as a liquid crystal display or a CRT display, and receives the user's operations such as input of data.

Moreover, the magnetic field analyzer 4 for a rotating machine may comprise a communication interface 47, and may download the computer program 50 of the present invention from a server device 3 connected to the communication interface 47 and execute processing by the CPU 41.

Figure 7:
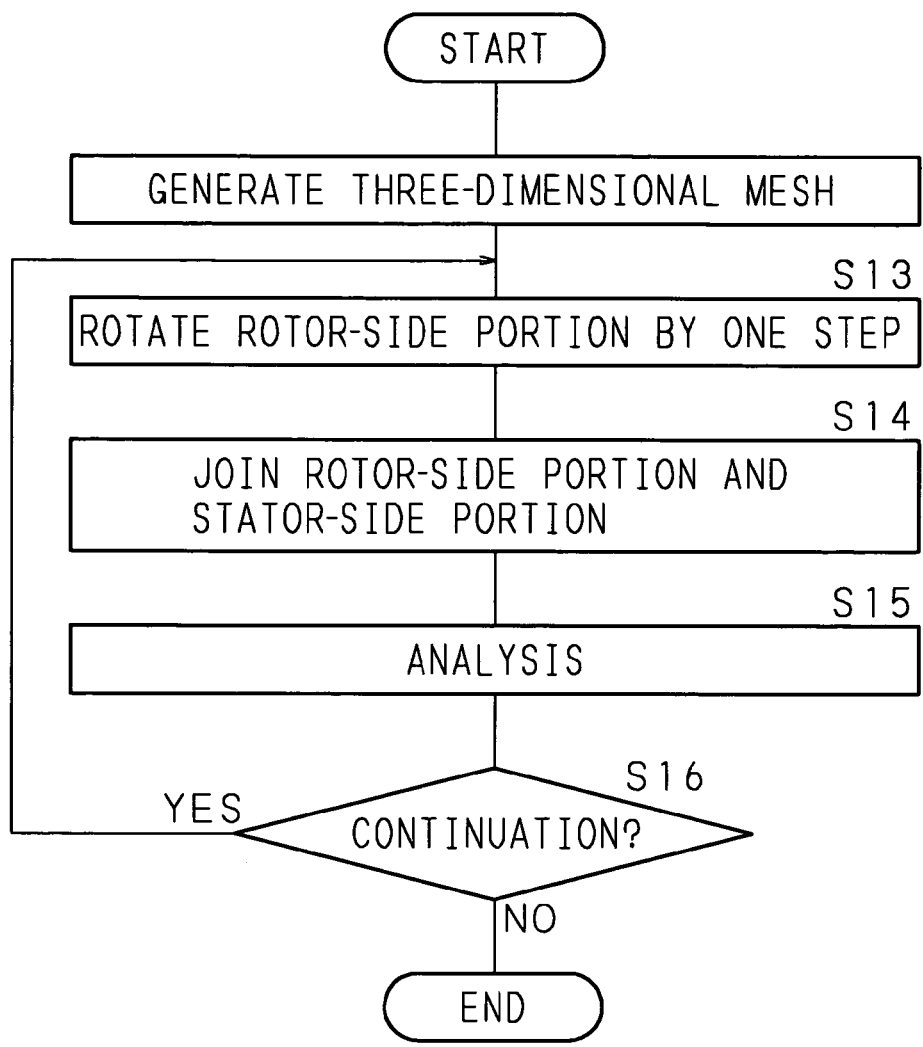
FIG. 7 is a flowchart showing the processing steps performed by a CPU of the magnetic field analyzer for a rotating machine according to the present invention.

FIG. 7 is a flowchart explaining the processing steps performed by the CPU 41 of the magnetic field analyzer 4 for a rotating machine of the present invention. The CPU 41 generates a three-dimensional mesh of a rotating machine to be analyzed by using the above-described three-dimensional mesh generation method (step S12), and rotates the rotor-side portion by one step by shifting the rotor-side portion from the boundary surface by an amount of one element with respect to the stator-side portion (step S13). Next, the rotor-side portion and the stator-side portion are joined at the boundary surface (step S14), and a magnetic field analysis of the rotating machine is performed using a finite element method (step S15). Next, based on whether or not there is an instruction to finish the analysis from the user, the CPU 41 decides whether or not to continue the analysis process (step S16). If the CPU 41 decides to continue the analysis process (step S16: YES), the procedure is returned to step S13. If the CPU 41 decides not to continue the analysis process (step S16: NO), the procedure is finished.

Although this embodiment illustrates a mode in which the magnetic field analyzer 4 for a rotating machine comprises means for generating a three-dimensional mesh, the present invention is not limited to this mode, and it may be possible to implement a mode in which the magnetic field analyzer 4 for a rotating machine does not comprise means for generating a three-dimensional mesh, and is constructed so that the data of a three-dimensional mesh generated by the three-dimensional mesh generator 1 is inputted to the magnetic field analyzer 4 for a rotating machine, and the magnetic field analyzer 4 for a rotating machine performs a magnetic field analysis of the rotating machine by using the inputted the three-dimensional mesh data.

INDUSTRIAL APPLICABILITY

As described above, in the present invention, for the magnetic field analysis of a rotating machine, when generating three-dimensional meshes of the stator-side portion and the rotor-side portion by setting a boundary surface in the spatial area between the stator and the rotor of the rotating machine, tetrahedral elements including nodes of each of the stator-side portion and the rotor-side portion are respectively created based on quadrilateral element data constituting the boundary surface divided by a suitable method, and polyhedral element or polygonal element data constituting the stator-side portion and the rotor-side portion excluding the boundary surface; a point is created at an arbitrary distance from the gravity of the quadrilateral element in a normal direction for each of the quadrilateral elements constituting the boundary surface; mesh division is performed for the tetrahedral elements based on the nodes on the boundary surface and the arbitrary point; and mesh division is further performed based on the nodes constituting the stator and the rotor to generate the three-dimensional meshes of the stator-side portion and the rotor-side portion. Accordingly, even for a rotating machine whose shape is so complicated that a three-dimensional mesh cannot be generated by the conventional three-dimensional mesh generation method in which a two-dimensional mesh is generated on a cross section perpendicular to the rotation axis of the rotating machine and a three-dimensional mesh is generated by extending the generated two-dimensional mesh in the rotation axis direction, it is possible to generate three-dimensional meshes of the stator-side portion and the rotor-side portion respectively, and thus it is possible to generate the three-dimensional meshes of the stator-side portion and the rotor-side portion for a magnetic field analysis regardless of the shape of the rotating machine.

Moreover, in the present invention, by performing mesh generation for tetrahedral elements including nodes of each of the stator-side portion and the rotor-side portion by the Delaunay method based on nodes, it is possible to fully automatically divide the stator-side portion and the rotor-side portion into tetrahedral elements to generate meshes.

Further, in the present invention, since the magnetic field analysis of the rotating machine is performed by the finite element method using the generated three-dimensional meshes, it is possible to perform accurate magnetic field analysis in a shorter calculation time.

The invention claimed is:

1. A three-dimensional mesh generation method for generating three-dimensional meshes of a rotating machine composed of a stator and a rotor to derive an output for analysis and display upon a computer system, comprising steps of:
   setting a boundary surface in a spatial area between the stator and the rotor to separate the rotating machine and the spatial area into a stator-side portion and a rotor-side portion and prescribing shapes of the stator-side portion and the rotor-side portion;
   dividing the boundary surface into quadrilateral elements;
   dividing each of the stator-side portion and the rotor-side portion into tetrahedral elements including nodes;
   creating a point at an arbitrary distance from a center of a gravity of the quadrilateral element to the rotor side in a normal direction for each of the quadrilateral elements constituting the boundary surface and performing mesh division for the tetrahedral elements based on the point at the arbitrary distance and nodes on the boundary surface; and
   performing mesh division based on nodes of the stator and the rotor to generate three-dimensional meshes of the stator-side portion and the rotor-side portion.

2. The three-dimensional mesh generation method as set forth in claim 1, wherein the mesh division is performed using the Delaunay method.

3. A method of performing a magnetic field analysis of a rotating machine by a finite element method using a three-dimensional mesh of the rotating machine including a spatial area between a stator and a rotor, said method comprising:
   generating a three-dimensional mesh of a rotating machine to be analyzed by using the three-dimensional mesh generation method defined in claim 1; and rotating the three-dimensional mesh of the rotor-side portion by shifting the elements from the boundary surface, and performing a magnetic field analysis by the finite element method.

4. A method of performing a magnetic field analysis of a rotating machine by a finite element method using a three-dimensional mesh of the rotating machine including a spatial area between a stator and a rotor, said method comprising:
   generating a three-dimensional mesh of a rotating machine to be analyzed by using the three-dimensional mesh generation method defined in claim 2; and rotating the three-dimensional mesh of the rotor-side portion by shifting the elements from the boundary surface, and performing a magnetic field analysis by the finite element method.

* * * * *